US011560071B2

(12) United States Patent
Constien

(10) Patent No.: US 11,560,071 B2
(45) Date of Patent: Jan. 24, 2023

(54) DEVICE FOR IMPROVING THE ACCESSIBILITY OF THE STORAGE SPACE BELOW VEHICLE SEATS

(71) Applicant: Constin GmbH, Berlin (DE)

(72) Inventor: Hans-Peter Constien, Berlin (DE)

(73) Assignee: Constin GmbH, Berlin (DE)

( * ) Notice: Subject to any disclaimer, the term of this patent is extended or adjusted under 35 U.S.C. 154(b) by 0 days.

(21) Appl. No.: 16/617,794

(22) PCT Filed: May 28, 2018

(86) PCT No.: PCT/DE2018/000166
§ 371 (c)(1),
(2) Date: Nov. 27, 2019

(87) PCT Pub. No.: WO2018/219375
PCT Pub. Date: Dec. 6, 2018

(65) Prior Publication Data
US 2020/0086765 A1   Mar. 19, 2020

(30) Foreign Application Priority Data

May 29, 2017   (DE) ..................... 10 2017 005 267.0
May 29, 2017   (DE) ..................... 20 2017 002 920.0

(51) Int. Cl.
*B60N 2/04*      (2006.01)
*B60N 2/30*      (2006.01)
*B60N 2/02*      (2006.01)

(52) U.S. Cl.
CPC .......... *B60N 2/045* (2013.01); *B60N 2/3056* (2013.01); *B60N 2/3088* (2013.01); *B60N 2002/0212* (2013.01)

(58) Field of Classification Search
None
See application file for complete search history.

(56) References Cited

U.S. PATENT DOCUMENTS 3,596,981 A * 8/1971 Koziol ..................... B60N 2/34
                                                297/154
3,601,351 A   8/1971 Ambrosius
3,687,484 A   8/1972 Cosby
(Continued)

FOREIGN PATENT DOCUMENTS

CN      201980063 U  *  9/2011
DE       19808567 A1     9/1999
(Continued)

OTHER PUBLICATIONS

International Search Report dated Nov. 9, 2018, in International Application No. PCT/DE2018/000166.
(Continued)

*Primary Examiner* — David E Allred
(74) *Attorney, Agent, or Firm* — Patent Central LLC; Stephan A. Pendorf

(57) ABSTRACT

A device for improving the accessibility to the space below a vehicle seat (1) and thus its use as a storage space. The device enables the position of the seat (1) or a seat guide (2) with the seat (1) arranged above to be moved in the direction of the front of the vehicle (7) such that accessibility to the stowage space which is in the form of a receiving container (6) or a support is ensured.

17 Claims, 5 Drawing Sheets

(56) References Cited

U.S. PATENT DOCUMENTS

| | | | | |
|---|---|---|---|---|
| 4,846,295 A * | 7/1989 | Shepard | A61G 5/1083 | 180/68.5 |
| 4,889,379 A * | 12/1989 | Aso | B60N 2/0232 | 296/64 |
| 5,890,758 A * | 4/1999 | Pone | B60N 2/3093 | 297/15 |
| 6,279,982 B1 * | 8/2001 | Nishimura | B60N 2/3011 | 296/65.09 |
| 6,598,926 B1 * | 7/2003 | Price | B60N 2/06 | 296/65.09 |
| 6,648,392 B2 * | 11/2003 | Fourrey | B60N 2/3022 | 296/65.09 |
| 6,773,050 B1 * | 8/2004 | Hotary | B60K 37/00 | 296/64 |
| 7,685,655 B1 * | 3/2010 | Delmestri | A47C 17/17 | 5/39 |
| 7,793,364 B1 * | 9/2010 | Johnson | A61G 5/1002 | 4/480 |
| 9,193,410 B2 * | 11/2015 | Watanabe | B62J 11/00 | |
| 10,137,806 B2 * | 11/2018 | Neighbors | B60N 2/3075 | |
| 10,406,986 B2 * | 9/2019 | Roy | B60R 7/043 | |
| 11,091,230 B2 * | 8/2021 | Curts | B63B 3/54 | |
| 2001/0030069 A1 | 10/2001 | Misu et al. | | |
| 2003/0068545 A1 * | 4/2003 | Wu | H01M 2/24 | 429/98 |
| 2003/0197393 A1 | 10/2003 | Hanagan | | |
| 2004/0046429 A1 * | 3/2004 | Marshall | A47C 7/52 | 297/188.12 |
| 2004/0107498 A1 * | 6/2004 | Maas | A47C 17/1756 | 5/37.1 |
| 2005/0146186 A1 * | 7/2005 | Kinnou | B60N 2/203 | 297/331 |
| 2006/0037523 A1 * | 2/2006 | Futaki | B63B 29/04 | 114/55.53 |
| 2007/0040418 A1 * | 2/2007 | Ohkuma | B60N 2/3075 | 297/15 |
| 2008/0284214 A1 * | 11/2008 | Neale | B60N 2/06 | 297/15 |
| 2010/0117393 A1 * | 5/2010 | Yamashita | B60N 2/01591 | 296/37.8 |
| 2012/0235006 A1 * | 9/2012 | Sailer | B60N 2/01 | 248/429 |
| 2013/0256046 A1 * | 10/2013 | Kyoden | B62M 7/12 | 180/68.5 |
| 2013/0280591 A1 * | 10/2013 | Kim | H01M 2/0486 | 429/160 |
| 2014/0152099 A1 * | 6/2014 | Boyd | H02J 7/0025 | 307/23 |
| 2014/0225403 A1 * | 8/2014 | Shimada | B60N 2/06 | 297/188.1 |
| 2014/0239904 A1 * | 8/2014 | Tanaka | H01M 10/0481 | 320/128 |
| 2014/0338999 A1 * | 11/2014 | Fujii | B60L 50/66 | 180/68.5 |
| 2015/0137564 A1 * | 5/2015 | Cuddihy | B60R 21/015 | 297/94 |
| 2015/0142245 A1 * | 5/2015 | Cuddihy | B60N 2/01 | 701/23 |
| 2015/0142273 A1 * | 5/2015 | Cuddihy | B60N 2/06 | 701/49 |
| 2015/0217659 A1 * | 8/2015 | Seimiya | H01M 2/1077 | 429/71 |
| 2015/0329019 A1 * | 11/2015 | Abe | B60N 2/3011 | 296/65.09 |
| 2015/0352983 A1 * | 12/2015 | Cailleteau | B60N 2/242 | 297/340 |
| 2016/0221454 A1 * | 8/2016 | Dougan | B60L 53/11 | |
| 2016/0280095 A1 * | 9/2016 | Frye | B60N 2/206 | |
| 2016/0325643 A1 | 11/2016 | Klein-Hitpass et al. | | |
| 2016/0332495 A1 * | 11/2016 | Franker | B60G 11/48 | |
| 2017/0166089 A1 * | 6/2017 | Frye | B60N 2/0296 | |
| 2017/0361737 A1 * | 12/2017 | Ziolek | B60N 2/309 | |
| 2018/0134182 A1 * | 5/2018 | Hoshide | B64D 11/0696 | |
| 2019/0315254 A1 * | 10/2019 | Tucker | B60N 2/502 | |
| 2020/0215943 A1 * | 7/2020 | Hayashi | B60N 3/004 | |
| 2020/0339210 A1 * | 10/2020 | Buell | B62K 19/12 | |

FOREIGN PATENT DOCUMENTS

| | | | | |
|---|---|---|---|---|
| DE | 60128619 T2 | | 1/2008 | |
| DE | 102011122101 A1 | | 9/2012 | |
| DE | 102014207529 A1 | | 7/2015 | |
| EP | 2873555 A1 | | 5/2015 | |
| FR | 3065682 A1 | * | 11/2018 | ............ B60N 2/065 |
| JP | 04078675 A | * | 3/1992 | |
| JP | 09328039 A | * | 12/1997 | |
| JP | 2005304851 A | * | 11/2005 | |
| WO | 2016082818 A1 | | 6/2016 | |

OTHER PUBLICATIONS

International Preliminary Report on Patentability dated Dec. 3, 2019, in International Application No. PCT/DE2018/000166.

\* cited by examiner

DEVICE FOR IMPROVING THE ACCESSIBILITY OF THE STORAGE SPACE BELOW VEHICLE SEATS

The invention relates to the accessibility of the space below vehicle seats, in particular in order to arrange energy storage devices for vehicles operated fully or partially by an electric motor, consequently as a storage space.

In known motor vehicles, it is difficult to access the space below motor vehicle seats in order to stow objects there or to remove objects therefrom. The usually horizontally displaceable seat conceals large parts of the space below the respective seat or only partially exposes the space.

In DE 10 2011 122 101 A1, the accessibility of the storage space below the front seats from the underside of the floor is proposed. Such solutions require the floor to be accessible in order to replace e.g. energy storage devices. Such solutions are not suitable for quickly replacing energy storage devices by hand at a battery changing station.

WO2016/082 818 A1 proposes that the seats arranged on a seat frame be configured such that said seats are horizontally displaceable with said seat frame and are tiltable relative to the seat frame, in order to make energy storage devices below the seats accessible and thus replaceable from above.

However, this certainly advantageous approach to solving the problem is not explained in greater detail thereafter. This is the object of the present invention.

According to the invention, in order to improve the accessibility of the space below a vehicle seat and thus its use as a storage space, a device is proposed which enables the position of the seat or a seat guide with the seat arranged above to be moved in the direction of the front of the vehicle such that the accessibility of the space which is in the form of a receiving container or a tray is ensured.

The term 'tray' in the sense used here means e.g. a depression in the floor or a flat enclosure for receiving a container. The items stored in the tray can be fixed by e.g. an elastic band.

The term 'receiving containers' in the sense used here means in particular a reservoir having a bottom and side walls which simultaneously laterally stabilize the goods to be received. The receiving container can be closed by a lid. The bottom can also be formed by the vehicle floor and the side walls can be connected to the vehicle floor.

In a first embodiment, it is provided that the seat or the seat guide with the seat arranged thereon is connected by means of a telescopic guide or a scissors-type guide, as it is known e.g. under the designation lazy-tongs, to the vehicle floor or to the receiving container below the vehicle seat, wherein a horizontal displaceability of the seat or the seat guide with the seat arranged thereon in the direction of the front of the vehicle and back is ensured by the telescopic guide or the scissors-type guide.

A second embodiment provides that the seat or the seat guide is connected by means of a parallel rocker to the vehicle floor or the receiving container, wherein a swiveling of the seat or of the seat with the seat guide in the direction of the front of the motor vehicle and back is ensured by the parallel rocker. The swiveling is preferably effected from a parallel position to the vehicle floor into another parallel position and back.

The advantage of utilizing a seat guide is that the seat is adjustable by the vehicle occupants in the conventional manner to their desired seat position. This does not affect the gear mechanism-related measures in connection with the accessibility of the tray or of the receiving container below the vehicle seat.

The telescopic guide or the scissors-type guide or the parallel rocker is preferably dimensioned such that, following the displacement or swiveling, the tray or the receiving container below the vehicle seat is completely exposed from above.

Individual battery cells or other objects are thus conveniently insertable from above into the receiving container or into the tray below the seat or are removable therefrom. It is thus possible to replace the battery at any battery changing station and the journey can then quickly be resumed.

The present invention preferably deals with making use of the space below the front seats, but it is not restricted thereto.

In a preferred embodiment, one each of a telescopic guide or a scissors-type guide or one each of a parallel rocker is arranged on both sides of the vehicle seat.

In order to make optimum use of the space of the receiving container, a configuration provides that the telescopic guides or the scissors-type guides or the parallel rockers are arranged outside the receiving container.

In order to exclude the possibility of the seat or the seat guide moving independently out of the seat position, an advantageous configuration provides that the seat or the seat guide is fixable in the seated position for the vehicle occupant by a latching device.

As already mentioned above, the tray or the receiving container is to preferably serve to arrange energy storage devices which are electrically coupled to one another. In a preferred embodiment, said energy storage devices have plug contacts on the bottom, which engage in corresponding receptacles on the vehicle floor or the bottom of the receiving container in order to establish the energy coupling.

In order to further ensure that the occupants in the back seats have sufficient legroom, a preferred embodiment provides that the control electronics for coupling the energy storage devices are arranged in a front region below the front seat of the vehicle.

If the indicated parallel rockers are deployed, these are advantageously designed such that they lie on top of each other in the seated position and in the swiveling position and thus block a further swiveling movement.

It suffices for the parallel rockers to be connectable to a locking mechanism at least in the seated position.

Rattles of the rockers lying on top of one another can be avoided by a sound-insulating coating of the rockers—including if these are only arranged here and there. It is also possible to provide cushioning of the two rockers with respect to one another. The advantage of this is that the locking mechanism is spring-loaded.

The invention shall be explained with reference to the drawings, wherein.

Figure 1:
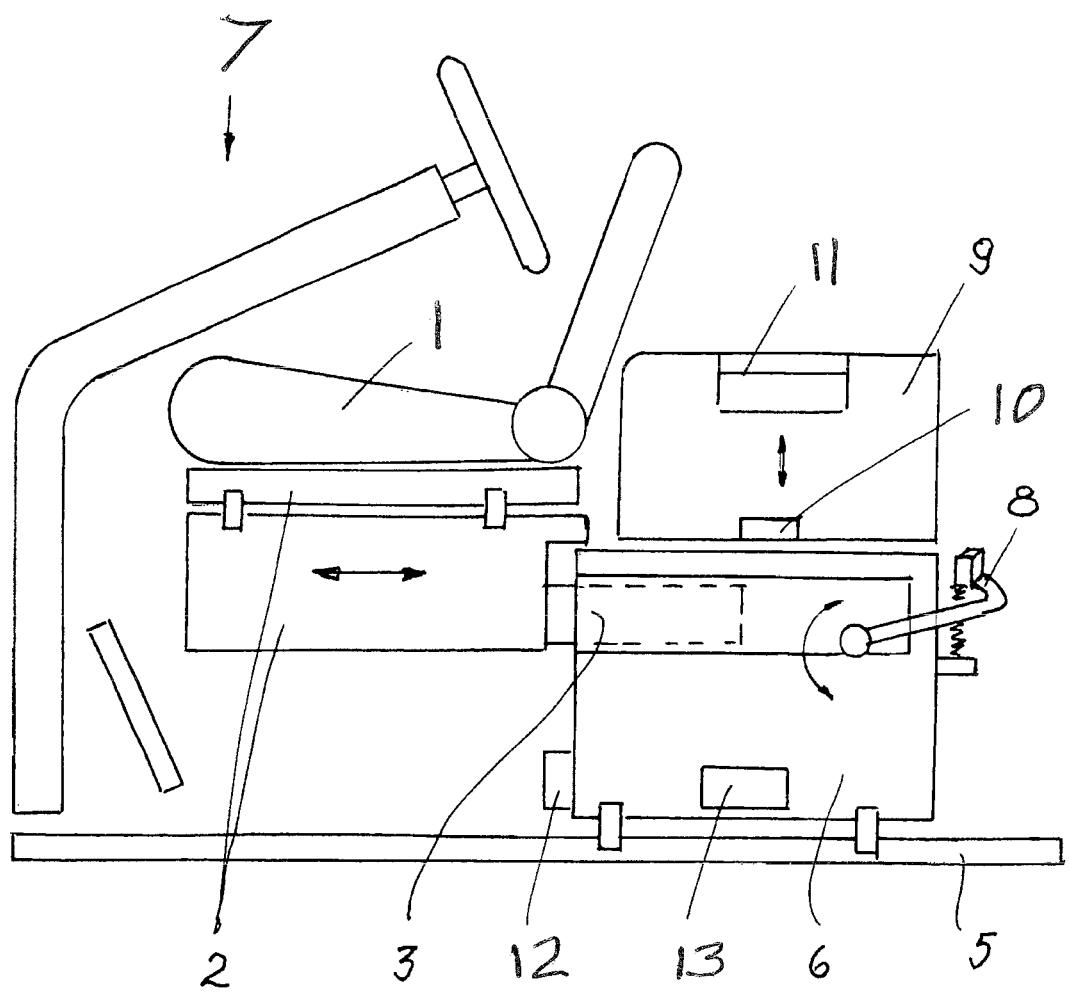
FIG. 1 shows the seat displacement by means of a telescopic guide.

FIG. 1 shows a seat 1 having a seat guide 2 which is displaced together with the seat 1 so that the receiving container 6 located under the seat 1 in the seated position is now fully accessible.

The seat guide 2 comprises the side walls of the receiving container 6 at a spacing in which the telescopic guide 3 is arranged. Alternatively, the telescopic guide can also be supported on the vehicle floor, in this case also preferably on both sides. This is in particular important if no separate receiving container 6 is provided.

The telescopic guide 3 is dimensioned such that, when the seat 1 is completely displaced in the direction of the front of the vehicle 7, the opening of the receiving container 6, which points upwards, is completely open. The objects located in the receiving container 6—in this case the energy storage devices 9—can thus be removed upwards without any problems and other objects e.g. charged energy storage devices 9 can be inserted. As represented, the energy storage devices 9 have an upper handle 11 and the plug contacts 10. Together with the receptacle 13 for the plug contacts 10, the energy is consumed at the bottom of the energy storage device 9 or the receiving container 6.

It is even possible to dispense with a receiving container 6 in the case of energy storage devices 9 having such a configuration, since the plug contacts 10 prevent lateral displacement. A rubber band engaging over the energy storage devices 9 prevents the plug contacts 10 loosening.

It is further represented that the seat guide 2 is fixable in the seated position by means of a latching device 8, as a result of which independent displacement of the telescopic device and, thus, of the seat 1 is impossible during driving, in particular during braking.

In order to ensure as much legroom as possible for persons in the back seats, the control sensor technology 12 is arranged in the front region of the receiving container 6 and outside the latter.

Figure 2:
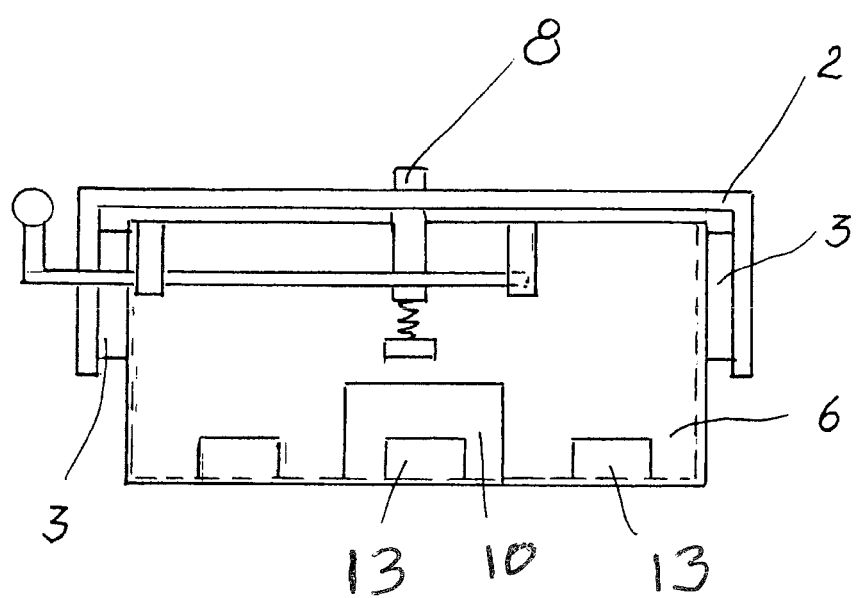
FIG. 2 shows a front view having a telescopic guide.

FIG. 2 shows a front view of the telescopic guide 3. The seat guide 2 comprises the side walls of the receiving container 6 at a spacing in which a telescopic guide 3 is arranged on both sides. In the corresponding top view according to FIG. 3, the arrangement of the energy storage devices 9 in the receiving container 6 is shown. The energy storage devices 9 can be removed upwards from the receiving container 6 by means of the handles 11. The cuboid energy storage devices 9 can be arranged both in the longitudinal direction of the vehicle—as represented, and transversely to the longitudinal direction of the vehicle.

Figure 4:
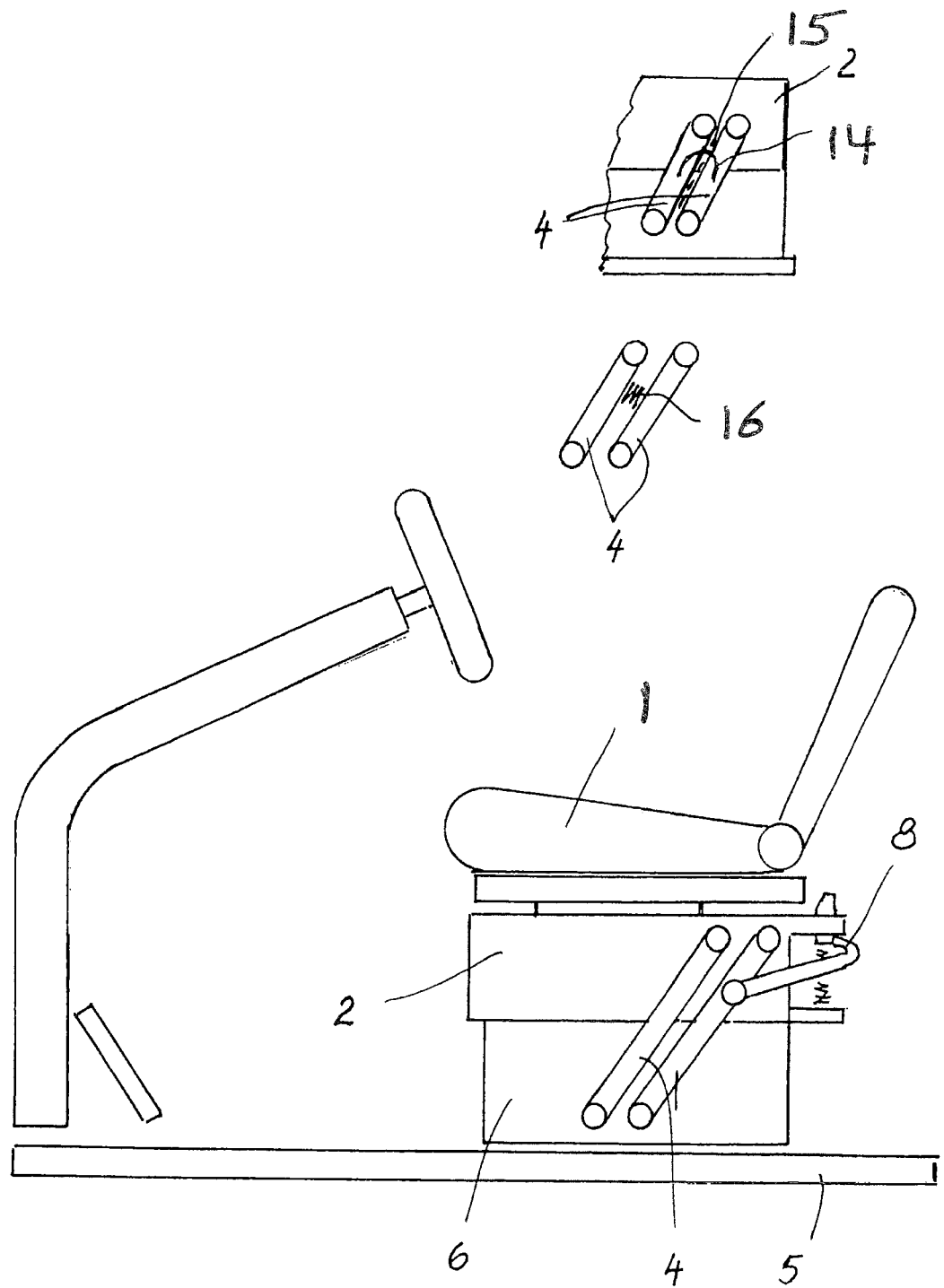
FIG. 4 shows the seat displacement by means of a parallel rocker.
Figure 5:
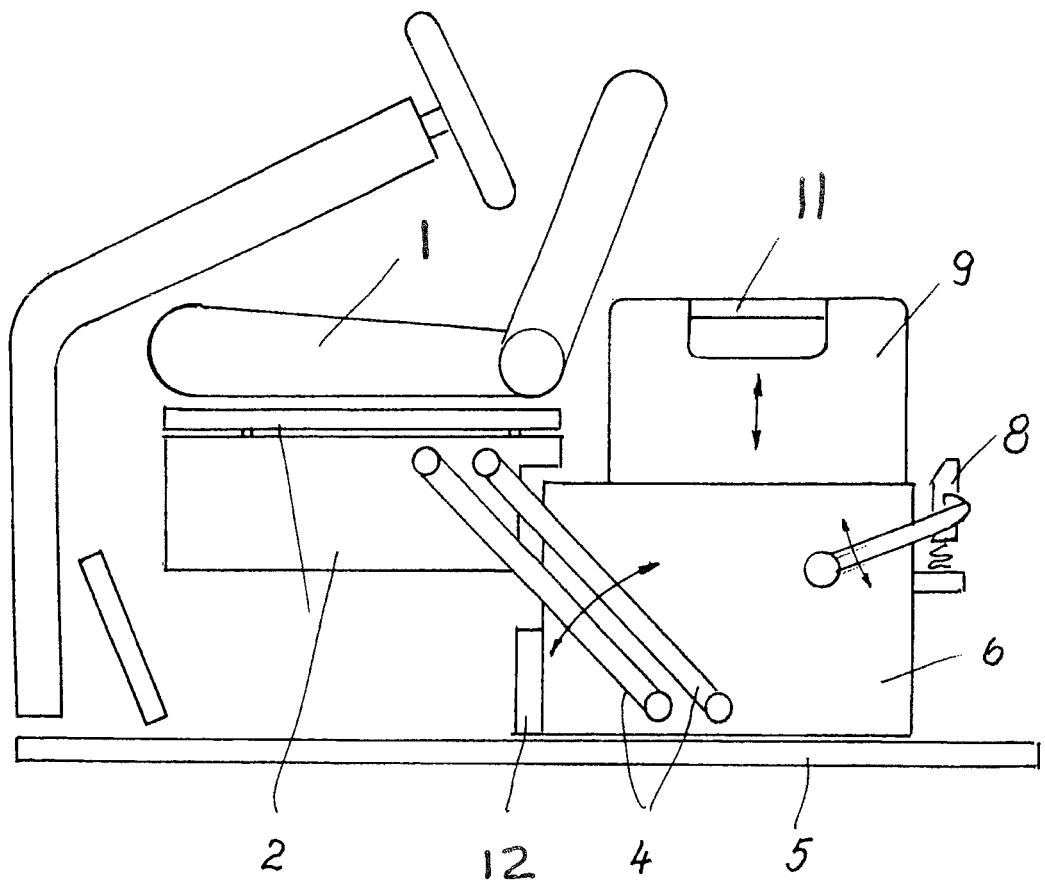
FIG. 5 shows the replacement of the energy storage devices.

In FIGS. 4 and 5, an embodiment with a parallel rocker 4 instead of a telescopic guide 3 is represented. Here as well, a parallel rocker 4 is in each case arranged on both sides of the seat guide, which parallel rocker is movable into the end positions: complete coverage (FIG. 4) and complete accessibility (FIG. 5).

The parallel rockers 4 are fastened, in one case, to the seat guide 2 and, in one case, to the receiving container 6 or to the vehicle floor 5. The parallel rockers 4 can also be fastened to the seat guide 2 in the spacing between the receiving container 6 and the side wall of the seat guide 2 comprising the receiving container 6.

Figure 3:
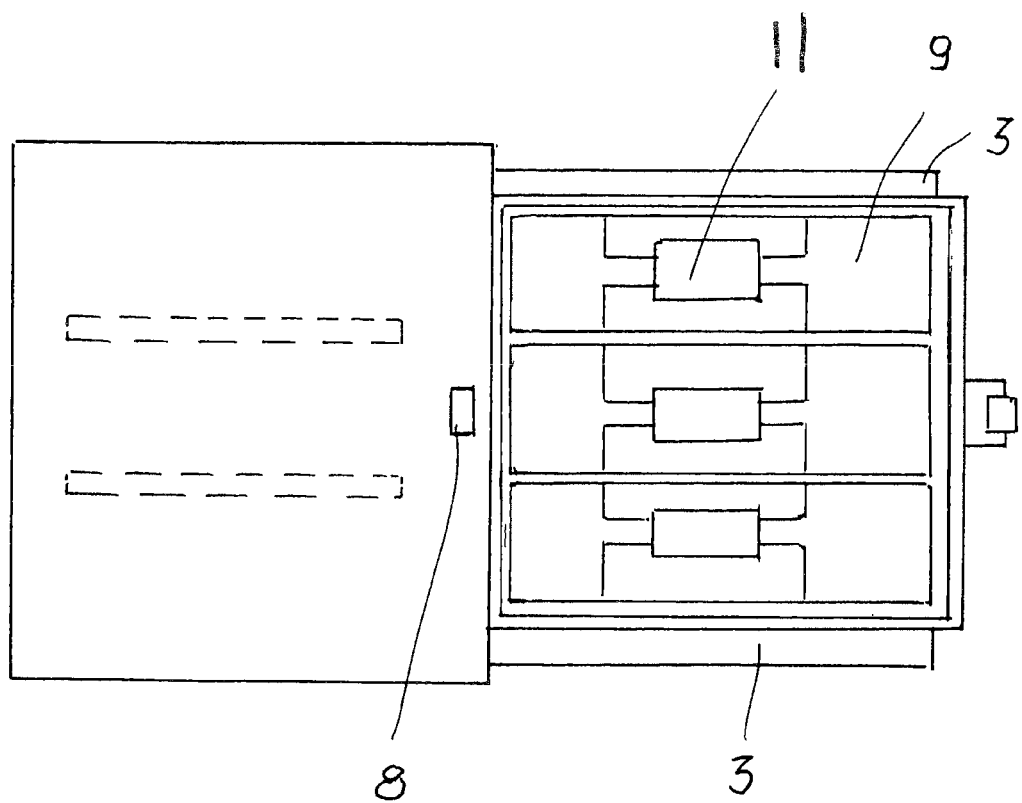
FIG. 3 shows a top view of the telescopic guide.

Otherwise, the same explanations relating to the arrangement of the energy storage device and control electronics 12 as for FIGS. 1 to 3 apply.

Utilizing parallel rockers 4 offers the possibility of sizing these such that they block each other in the end positions, i.e. the two rockers of the parallel rockers 4 lie on top of one another in these positions. This can be simply achieved by widening the individual rockers.

In this case, a locking 12 of the two rockers in the complete coverage position is sufficient to ensure road safety.

In order to prevent rattles caused by the rockers lying on top of each other, a sound-absorbing coating can be provided on one or both rockers of the parallel rockers 4.

A spring support can also be arranged between the rockers lying on top of one another.

LIST OF REFERENCE NUMERALS

1 Seat
2 Seat guide
3 Telescopic guide
4 Parallel rocker
5 Vehicle floor
6 Receiving container
7 Front of vehicle
8 Latching device
9 Energy storage device
10 Plug contacts
11 Handle
12 Control electronics
13 Receptacles for plug contacts
14 Locking mechanism
15 Sound-absorbing coating
16 Spring support

The invention claimed is:
1. A vehicle including
a longitudinal axis, a vehicle front (7) and a vehicle floor (5),
a receiving container (6) having a bottom and first and second side walls, wherein the receiving container (6) bottom is formed by the vehicle floor (5), and wherein the receiving container (6) side walls are connected stationary to the vehicle floor (5),
a seat (1) mounted on a seat guide (2) for adjustment of the position of the seat (1),
means (3, 4) for movement of the seat (1) and seat guide (2) between a seated position and an open position in the direction of the vehicle front (7), wherein the means (3, 4) for movement is mounted on the receiving container (6) side walls,
the receiving container (6) defining a storage space between the vehicle seat (1), the receiving container (6) first and second side walls and the vehicle floor (5),
wherein the means (3, 4) for movement of the seat (1) and the seat guide (2) is adapted to moving the vehicle seat (1) and seat guide (2) in the direction of the vehicle front (7) parallel to the vehicle floor (5) to the open position in which access to the storage space is exposed from above.
2. The vehicle according to claim 1, wherein the means (3, 4) for movement is a telescopic guide (3), a scissors-type guide or a parallel rocker, and wherein one each of the telescopic guide (3) or the scissors-type guide or the parallel rocker (4) is arranged on each of the first and second side walls of the receiving container (6).
3. The vehicle according to claim 2, wherein the telescopic guide (3) or the scissors-type guide or at least a part of the parallel rockers (4) is concealed by a side wall of receiving container (6).
4. The vehicle according to claim 1, wherein the seat guide (2) is fixable in the seated position for the vehicle occupant by a latching device (8).
5. The vehicle according to claim 1, wherein the receiving container (6) serves to arrange energy storage devices (9) which are electrically coupled to one another, wherein the energy storage devices (9) have plug contacts (10) on the bottom, which engage in corresponding receptacles (13) on the vehicle floor (5) in order to establish the energy coupling.

6. The vehicle according to claim 5, wherein control electronics (12) for coupling and controlling the energy storage devices (9) are arranged in a front region below the vehicle front seat (1).

7. The vehicle according to claim 2, wherein the parallel rockers (4) are sized such that they lie on top of each other via support surfaces in the seated position and in the open position and thus block a further displacement movement.

8. The vehicle according to claim 7, further comprising a locking mechanism (14) to which the parallel rockers (4) are connectable at least in the seated position.

9. The vehicle according to claim 7, wherein the support surfaces of the parallel rockers (4) have a sound-absorbing coating (15) and/or a spring support (16).

10. The vehicle according to claim 1, wherein the seat guide (2) is position-adjustable along the longitudinal axis of the vehicle.

11. The vehicle according to claim 2, wherein the seat guide (2) cooperates with a telescopic guide (3).

12. The vehicle according to claim 2, wherein the seat guide (2) cooperates with a parallel rocker (4).

13. The vehicle according to claim 5, wherein energy storage devices (9) are arranged in the receiving container (6).

14. The vehicle according to claim 13, wherein the energy storage devices (9) are electrically coupled to one another.

15. The vehicle according to claim 13, wherein the energy storage devices (9) have plug contacts (10) which interact with storage spaces (13) in the vehicle floor (5) or in the floor of the receiving container (6).

16. The vehicle according to claim 1, wherein the vehicle seat (1) includes a lid for closing the receiving container (6).

17. The vehicle according to claim 1, wherein the seat guide (2) includes a lid for closing the receiving container (6).

* * * * *